United States Patent [19]

Takayanagi et al.

[11] Patent Number: 4,842,380
[45] Date of Patent: Jun. 27, 1989

[54] LIQUID CRYSTAL OPTICAL ELEMENTS

[75] Inventors: Takashi Takayanagi; Hideo Kawaguchi, both of Shizuoka, Japan

[73] Assignee: Fuji Photo Film Co., Ltd., Kanagawa, Japan

[21] Appl. No.: 86,982

[22] Filed: Aug. 19, 1987

[30] Foreign Application Priority Data

Aug. 19, 1986 [JP] Japan .................. 61-193706

[51] Int. Cl.[4] .................. G02F 1/13; C09K 19/54; C09K 19/52
[52] U.S. Cl. .................. 350/351; 252/299.01; 252/299.5; 252/299.66; 350/350 R; 350/350 S; 365/108; 428/1
[58] Field of Search ........... 252/299.01, 299.5, 299.66; 350/350 R, 350 S, 351; 365/108; 428/1

[56] References Cited

U.S. PATENT DOCUMENTS

| | | | |
|---|---|---|---|
| 3,947,375 | 3/1976 | Gray et al. | 252/299.66 |
| 3,983,049 | 9/1976 | Aftergut et al. | 252/299.5 |
| 4,011,173 | 3/1977 | Steinstrassner | 252/299.5 |
| 4,027,950 | 6/1977 | Moriyama et al. | 252/299.5 |
| 4,118,335 | 10/1978 | Krause et al. | 252/299.5 |
| 4,180,475 | 12/1979 | Schadt et al. | 252/299.5 |
| 4,293,435 | 10/1981 | Portugall et al. | 252/299.01 |
| 4,462,924 | 7/1984 | Raynes | 252/299.5 |
| 4,631,328 | 12/1986 | Ringsdorf et al. | 252/299.01 |
| 4,650,836 | 3/1987 | George et al. | 252/299.01 |
| 4,702,558 | 10/1987 | Coles et al. | 252/299.01 |

FOREIGN PATENT DOCUMENTS 3324770 1/1984 Fed. Rep. of Germany .................. 252/299.01
58-125247 7/1983 Japan .................. 252/299.5

OTHER PUBLICATIONS

Hopwood, A. I., et al., Polymer, vol. 26, pp. 1312–1318 (8/85).
Finkelmann, H., et al., Mol. Cryst. Liq. Cryst., vol. 89, pp. 23–36 (1982).

Primary Examiner—Teddy S. Gron
Attorney, Agent, or Firm—Sughrue, Mion, Zinn, Macpeak & Seas

[57] ABSTRACT

Disclosed is a liquid crystal optical element for use in information recording media and displays, which is composed of a polymeric liquid crystal and from 0.01% to 10% by weight, on the basis of the polymeric liquid crystal, of a biphenyl or biphenyl derivative of formula (I)

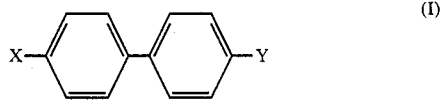

wherein X and Y each represents a hydrogen atom, an alkyl group, an oxyalkyl group, a halogen atom, a nitrile group, or a nitro group. By the addition of the biphenyl or biphenyl derivative, the orientation of the polymeric liquid crystal is improved.

9 Claims, 1 Drawing Sheet

LIQUID CRYSTAL OPTICAL ELEMENTS

FIELD OF THE INVENTION

The present invention relates to liquid crystal optical elements for use in information recording media, displays, and the like utilizing the memory effect of the liquid crystals.

BACKGROUND OF THE INVENTION

A so-called heat mode recording material is known as an information recording medium, utilizing the physical variation of the medium caused by the heat as generated by irradiation or absorption of a light having a high density energy such as a laser ray to the medium. In recent years, liquid crystal-containing systems have been investigated from the viewpoint of imparting an erasability to the recording media of this kind.

In the case of such systems, for example, a liquid crystal placed and sealed in a cell is vertically oriented, and a local part of the cell is heated to form an isotropic state. Then, after cooling, a light-scattering structure is formed, which is to be a recording point. This part is heated and then cooled while an electric charge is imparted thereto, whereby this is again back to the previous vertically oriented state. This corresponds to the erasing procedure. When a laser ray or the like which has a reduced beam diameter is used as a heating means during recording, information recording media with high density recording and erasure ability can be obtained. For instance, one example of this type is described in U.S. Pat. No. 4,405,993, British Patent Publication No. 2,090,673. However, the liquid crystals used in the above art are of low molecular weight, and have a low phase transition point between the liquid crystal phase and the isotropic liquid phase. That is, the clearing point thereof is low, falling within the range of from 50° C. to 60° C. or below, and therefore are poor in preservation stability and are defective. In addition, as the liquid crystal is in the form of a liquid state in the cell, this is mobile in the cell and the recording point is often broken, which is another defect. In order to overcome the latter defect, a means has been developed to provide a partition wall in the cell, as described in Japanese Patent Application (OPI) No. 100247/83 (the term "OPI" as used herein refers to a "published unexamined Japanese patent application"), which, however, causes complication of the manufacture process and the elevation of the manufacture cost.

The above-mentioned defects are believed to be overcome by the use of polymeric liquid crystals, as described in Japanese Patent Application (OPI) No. 125247/83 and German Patent Application (OLS) No. 3,324,770.

However, polymeric liquid crystals are defective, as compared with low molecular weight liquid crystals, in that it is difficult to achieve a vertically oriented state even after impartation of an electric charge thereto. Specifically, these would involve a strong double refraction or would partially involve a light-scattering structure which is inherently formed during recording. As a result, the error rate in the recorded points would become high, whereby the characteristics of the information recording media becomes extremely poor. In addition, the use of optical elements having such polymeric liquid crystals in displays is undesirable as causing the disorder of images formed.

SUMMARY OF THE INVENTION

The present invention has been effected in consideration of the above-described problems, and the main object of the present invention is to achieve an excellent oriented state of polymeric liquid crystals and to provide liquid crystals optical elements which are suitable for information recording media or displays.

Specifically, the present invention is characterized by the incorporation of a biphenyl or biphenyl derivative into a liquid crystal, to thereby attain improved orientation of the polymeric liquid crystal.

DETAILED DESCRIPTION OF THE INVENTION

Figure 1:
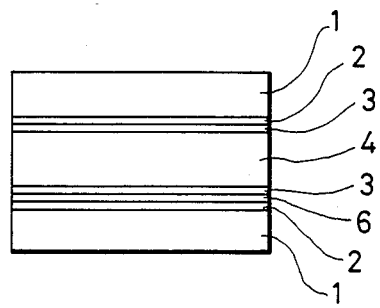
FIG. 1 through FIG. 5 show embodiments of liquid crystal optical elements of the present invention, which are not intended to limit the present invention. In these drawings, 1 is a support, 2 is a transparent electroconductive layer, 3 is an orientation assistant layer, 4 is a liquid crystal layer, 5 is a reflective layer, 6 is a light-absorbing layer, 7 is a light-polarizing plate.
Figure 2:
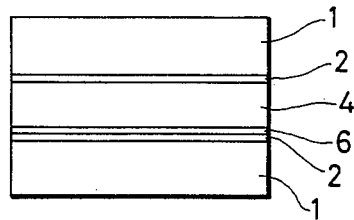
Figure 3:
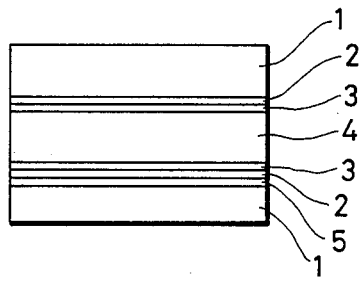
Figure 4:
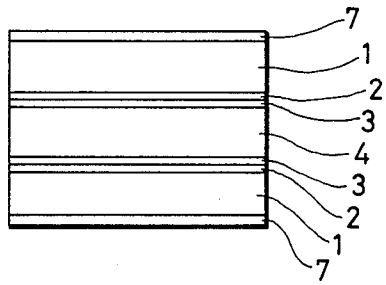

Specific embodiments of the present invention are explained in detail hereinafter.

The liquid crystals to be used in the present invention are polymeric liquid crystal compositions containing a biphenyl or a biphenyl derivative, and the polymeric crystal is carried between supports, each having a transparent electroconductive layer, to form a cell. Polymeric liquid crystals with positive dielectric anisotropy can be placed in the form of a vertically oriented state, for example, by converting the liquid crystal into an isotropic liquid and cooling the resulting liquid under electric charge. The vertically oriented cell is optically transparent, and when the cell is heated, for example, by local irradiation of a high density energy light, such as a laser ray, and then cooled, the light-irradiated part of the cell forms a light-scattering structure or a double refraction occurs, whereby recorded points are formed in the part. In such a state, reading or displaying of information is possible. Because of the use of polymeric liquid crystals in the present invention, the recorded points can be stably memorized at a temperature of about 80° C. or below. On the other hand, partial or complete erasure can be effected by localized or uniform heating of the recorded optical element, to thereby form the polymeric liquid crystal into an isotropic liquid, and then cooling the resulting liquid under electric charge.

The polymeric liquid crystals for use in the present invention are polymeric compounds having a mesogenic group via an alkyl chain in the side chain. Specifically, the side chain type polymeric liquid crystals are composed of three parts, viz., a main chain, a spacer, and a mesogenic group. The main chain may be any kind of main chain typical of polymeric compounds, preferably including a polyacrylate, a polysiloxane, a polymethacrylate, etc. The spacer is preferably a methylene chain or an oxymethylene chain having from 2 to 18 carbon atoms. Regarding the length of the chain of the spacer, if the chain has one carbon atom or has no carbon atom, the orientation of the liquid crystal would be interrupted by the main chain, and if the chain has 19 or more carbon atoms, the liquid crystal would crystallize and thereby involve no orientation. Preferred mesogenic groups are those having the following structures.

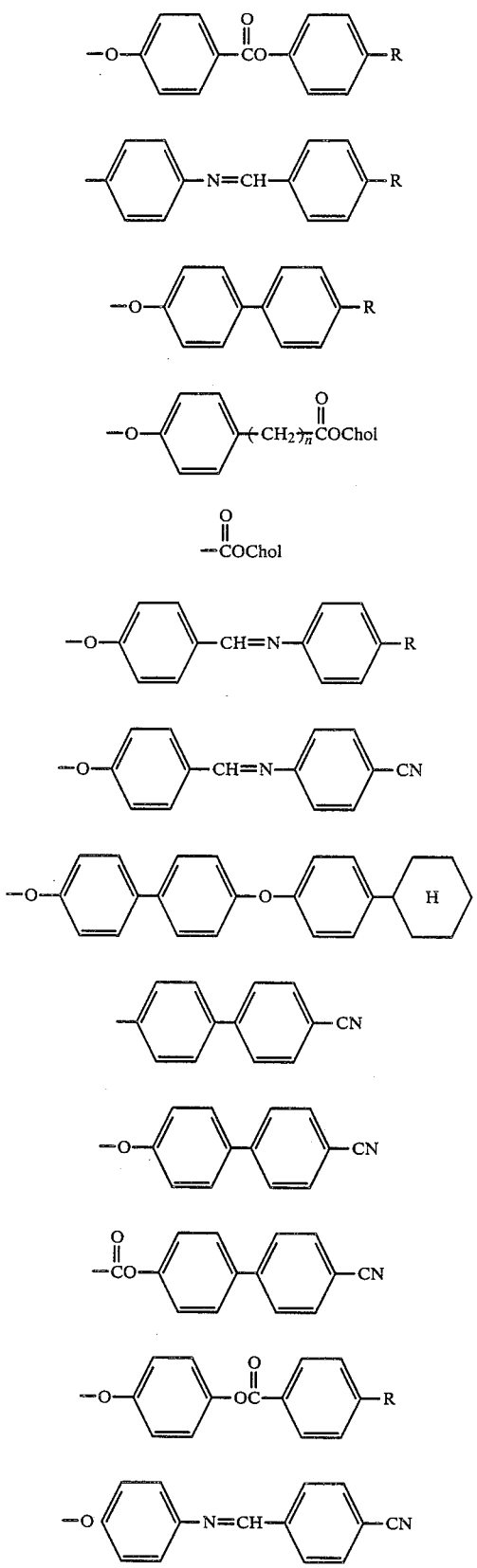
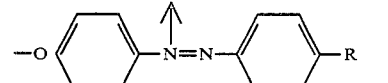
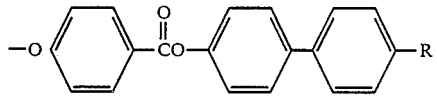

In the formulae, R represents —OCH$_3$, —OC$_2$H$_5$, —OC$_3$H$_7$, —OC$_4$H$_9$, —OC$_5$H$_{11}$, —OC$_6$H$_{13}$, —CH$_3$, —C$_2$H$_5$, —C$_3$H$_7$, —C$_4$H$_9$, —C$_5$H$_{11}$, —C$_6$H$_{13}$, —C$_7$H$_{15}$, —C$_8$H$_{17}$, H, Cl, Br, —C$_9$H$_{19}$, —C$_{10}$H$_{21}$, —C$_{11}$H$_{23}$, —C$_{12}$H$_{25}$, —C$_{14}$H$_{29}$, —C$_{16}$H$_{33}$, and Chol represents a compound represented by the formula

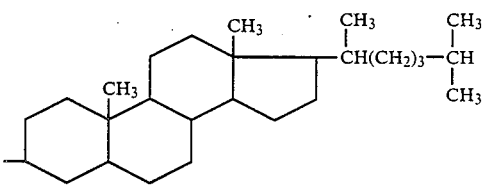

When polyacrylates and polymethacrylates form the main chain, these may be copolymerized with any others which have a side chain containing an alkyl chain or an aryl group different from that of the spacer or the mesogenic group-having side chain. In addition, copolymers having two or more different spacers and/or mesogenic group-having side chains can also be used. Moreover, low molecular weight liquid crystals and dyes can be blended within a limited range, provided that those as blended do not interfere with the liquid crystal state.

Preferable biphenyl and biphenyl derivatives which can be used in the present invention include those represented by formula (I)

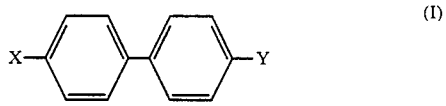

(I)

In formula (I), X and Y each is preferably a hydrogen atom, an alkyl group, an oxyalkyl group, a halogen atom, a nitrile group, or a nitro group. The alkyl group may have from 1 to 11 carbon atoms. If it has 12 or more carbon atoms, the solubility of the compound represented by formula (I) in polymeric liquid crystals would be low and the desired effect could not be attained. The oxyalkyl group may have from 1 to 15 carbon atoms. If it has 16 or more carbon atoms, the solubility of the compound represented by formula (I) in polymeric liquid crystals would also be low and the derivatives cannot be used.

Examples of the compounds represented by formula (I) which are preferably used in the present invention are set forth below.

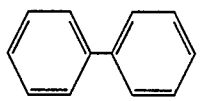

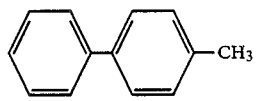
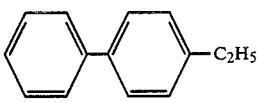
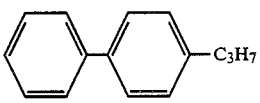
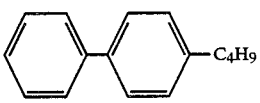
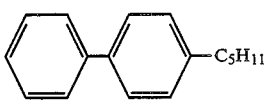
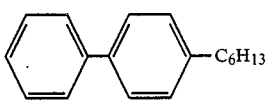
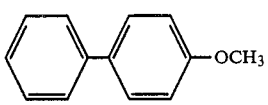
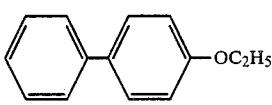
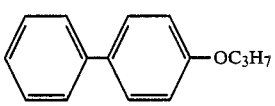
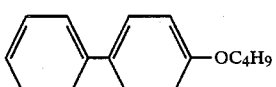
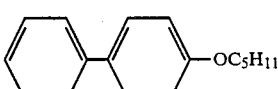
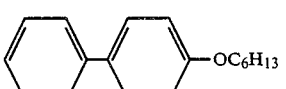
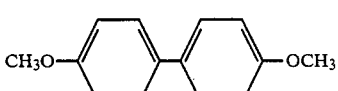

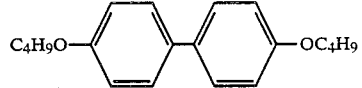
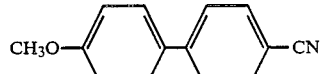
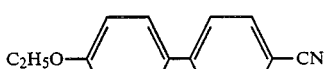
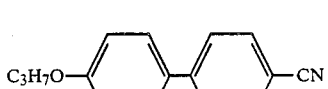
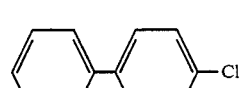
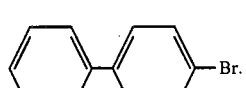

The amount of the above-mentioned biphenyl or biphenyl derivative to be added to polymeric liquid crystals in accordance with the present invention is from 0.01% to 10% by weight, preferably from 0.5 to 10% by weight, based on the polymeric liquid crystal. If the amount is less than 0.01% by weight, no improvement of the orientation of the polymeric liquid crystal can be attained. On the other hand, addition of more than 10% by weight would cause some defects, after repetition of recording and erasure, in that a part of the polymeric liquid crystal would crystallize and cause the generation of errors during the reproduction of the recorded information or the deterioration of images during the display of the recorded image, etc.

When the above-mentioned biphenyl or biphenyl derivatives are added in the form of a combination of two or more thereof, the total amount of the combination should desirably fall within the range of from 0.01% to 10% by weight.

The support for use in the present invention may be a glass or plastic sheet, etc., and is preferably a flexible and hardly breakable plastic sheet. For example, cellulose derivatives such as nitrocellulose, cellulose triacetate, etc., polyesters such as polyethylene terephthalate, polyethylene naphthalate, etc., polyolefins such as polycarbonate, polypropylene, polyethylene, etc., as well as polyvinyl alcohols, polyvinyl chlorides, polyvinylidene chlorides, nylons, polyethersulfones, etc., can be used.

In addition, as a general electroconductive plastic sheet having a transparent electroconductive layer, polyesters such as polyethylene terephthalate as well as polysulfones, polyethersulfones, polycarbonates, polyimides, etc., can be used.

As the transparent electrode, indium, tin oxides, etc., can be used.

In order to obtain a uniform vertical orientation of the polymeric liquid crystal, an orientation assistant is preferably coated. Specific examples of vertical orientation assistants which can be used include lecithin, stearic acid, hexadecyltrimethylammonium bromide, monobasic carboxylic acid-chromium complexes, organic silanes such as N,N-dimethyl-N-octadecyl-3-aminopropyltrimethoxysilyl chloride, etc., hexamethyldicyclohexane, perfluorodimethylcyclohexane, tetrafluoroethylene, polytetrafluoroethylene, Versamide 100 (produced by Henkel, Japan), octadecylmalonic acid, etc. Specific examples of horizontal orientation assistants which can be used include carbon, polyoxyethylene, Versamide 125 (produced by Henkel, Japan), polyvinyl alcohol, polyimide, diacidic carboxylic acid-chromium complexes, organic silanes, polyacetylene, dibasic fatty acids, crown ether, etc. In addition, the orientation assistant layer is preferably subjected to several time rubbing with synthetic fibers, natural fibers, metals, or the like.

In the case where the reproduction or image display is effected by means of a reflected light, a thin metal film may be provided as a reflective layer, such as aluminum, rhodium, gold, copper, etc., or alternatively, a plastic reflective plate or the like can be provided on the back surface of the transparent support.

In the practice of the present invention, means for heating the liquid crystal layer for phase transition can be, e.g., a laser ray, a xenon or the like flash lamp heating head, or a scanning electrode heater.

When a light is used as the heating means, a dye having a function of effectively converting the light into a heat can be added to the polymeric liquid crystal layer, or a dye-containing thin layer can be used as a light absorbing layer. As such a dye, any one which can absorb laser ray or the like to be irradiated or which can have absorption maximum in the wavelength of the light can be used. For instance, a dye of NKX 114G (manufactured by Nippon Kanko-Shikiso Kenkyujo, a structural formula below) or the like can be used for a YAG laser ray of 1.06 μm.

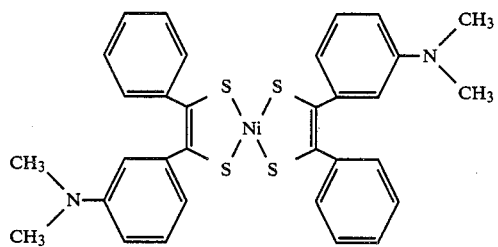

In the case where infrared laser rays such as an argon laser of 1.09 μm, a YAG laser of 1.06 μm, etc., are used for irradiation, the indium or tin oxide which is used as a transparent electrode can be a light absorbing material, and, therefore, provision of any further light absorbing layer is often unnecessary. Alternatively, a thin layer made of a metal or metal oxide having an absorption in such infrared region can be provided as a light absorbing layer.

The liquid crystal optical element of the present invention has a structure, for example, shown in FIG. 1 through FIG. 5.

In the erasure step for the present invention, an electric charge is imparted to the polymeric liquid crystal as positioned in the cell, whereupon the electric voltage to be imparted thereto is preferably $10^7$ V/cm or less. In addition, either direct current or alternate current can be used, but the latter is preferred as the deterioration of the polymeric liquid crystal with lapse of time is small. The frequency is preferred to fall within the range of from 10 Hz to 50 KHz. If this is less than 10 Hz, the current has no effect of alternate current and thereby the polymeric liquid crystals would often be deteriorated. If, on the contrary, this is more than 50 KHz, the orientation accelerating effect would often be lowered.

As the reproduction or display means for the present invention, an optical transmission percent or reflection percent can be utilized. In addition, a light-polarizing plate can be used or the cell can be sandwiched between crossed nicols for utilization of a polarized light.

The following examples are intended to illustrate the present invention, but not to limit it in any way.

EXAMPLE 1

Figure 5:
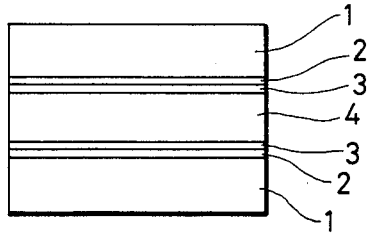

3 g of N,N,N-cetyltrimethylammonium bromide as an orientation assistant was dissolved in 3 liters of a 25 v/v % solution of propanol and a PET support having provided thereon a transparent electronconductive film was immersed in the resulting mixture for 4 minutes. The PET support obtained was dried by air and further dried by heating at 100° C. for 30 minutes to prepare an orientation assistant layer. Next, a polymeric liquid crystal composition comprising a polymeric liquid crystal (1) (see below) and 2% by weight, on the basis of the liquid crystal, of biphenyl was provided between the supports, and sealed therebetween in a thickness of 5 μm, to obtain a liquid crystal cell (FIG. 5).

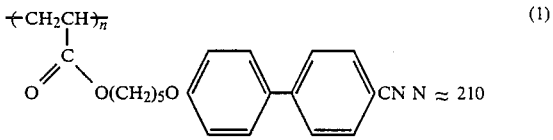

(1)

The liquid crystal cell was heated at 130° C., and then electrically charged under the conditions of 50 V and 100 Hz for vertical orientation. This was set below a crossed nicol and observed, which indicated uniform vertical orientation, with neither white cloud nor double refraction.

EXAMPLE 2

In the same manner as Example 1, except that 2% by weight of dimethoxybiphenyl was added in place of the biphenyl, another liquid crystal cell was formed. Also in this liquid crystal cell, a uniform vertical orientation with neither white cloud nor double refraction was attained.

COMPARATIVE EXAMPLE 1

In the same manner as in Example 1, except that no biphenyl additive was added, still another liquid crystal cell was formed. This had a visually noticeable white cloud and the vertical orientation thereof was noted to be fairly uneven.

As is clear from the above-mentioned examples, the addition of a biphenyl or biphenyl derivative to a polymeric liquid crystal, which is the characteristic feature of the present invention, is very effective for improving the orientation of the polymeric liquid crystal, and, in particular, is believed to contribute significantly to the improvement of the reliability of high density optical recording media and displays.

While the invention has been described in detail and which reference to specific embodiments thereof, it will be apparent to one skilled in the art that various changes and modifications can be made therein without departing from the spirit and scope thereof.

What is claimed is:

1. A liquid crystal optical element comprising a cell comprising two or more supports each having a transparent electroconductive layer, said cells containing a polymeric liquid crystal with positive dielectric anisotropy having a mesogenic biphenyl side chain, said polymeric liquid crystals being capable of being placed in the form of a vertically oriented state and being optically transparent in the vertically oriented state, and from 0.01% to 10% by weight, on the basis of said polymeric liquid crystal, of a non-liquid crystal biphenyl or biphenyl derivative represented by formula (I)

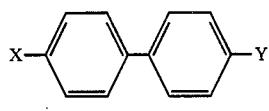

(I)

wherein X and Y each represents a hydrogen atom, an alkyl group, an oxyalkyl group, a halogen atom, a nitrile group, or a nitro group.

2. A liquid crystal optical element as in claim 1, wherein the biphenyl or biphenyl derivative is selected from the compounds

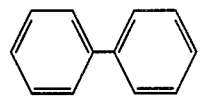

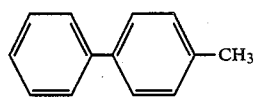

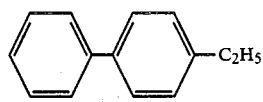

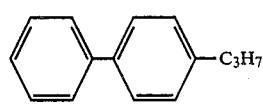

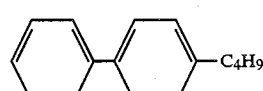

-continued

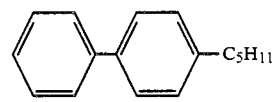

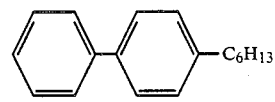

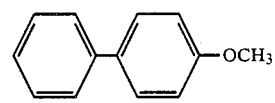

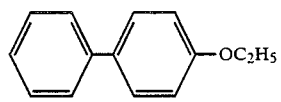

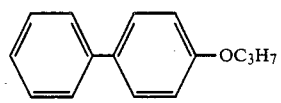

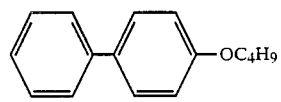

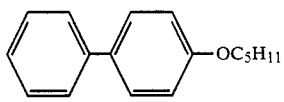

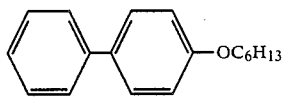

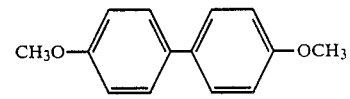

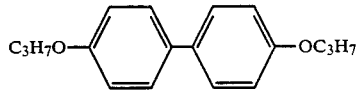

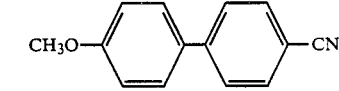

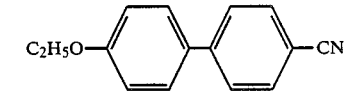

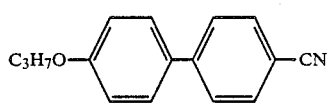

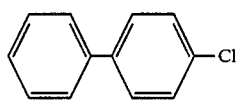

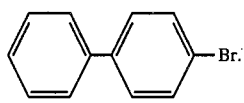

3. A liquid crystal optical element as in claim 1, wherein the polymeric liquid crystal is a polymeric compound having said mesogenic group via an alkyl chain in the side chain.

4. A liquid crystal optical element as in claim 1, wherein the polymeric liquid crystal is composed of three parts, consisting essentially of a main chain, a spacer, and a mesogenic group.

5. A liquid crystal optical element as in claim 4, wherein the main chain in the polymeric liquid crystal is a polyacrylate, polysiloxane, or polymethacrylate, the spacer therein is a methylene chain or an oxymethylene chain having from 2 to 18 carbon atoms, and the mesogenic group therein is selected from those represented by the formulae

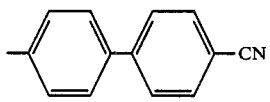

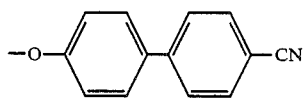

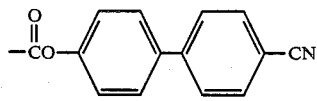

6. A liquid crystal optical element as in claim 2, wherein the polymeric liquid crystal is composed of three parts consisting essentially of a main chain, a spacer, and a mesogenic group.

7. A liquid crystal optical element as in claim 3, wherein the polymeric liquid crystal is composed of three parts consisting essentially of a main chain, a spacer, and a mesogenic group.

8. A liquid crystal optical element as in claim 4, wherein the main chain in the polymeric liquid crystal is a polyacrylate, polysiloxane or polymethacrylate, the spacer therein is a methylene chain or an oxymethylene chain having from 2 to 18 carbon atoms, and the mesogenic group therein is selected from those represented by formulae

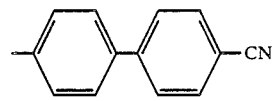

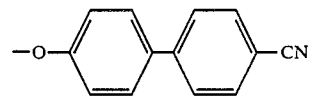

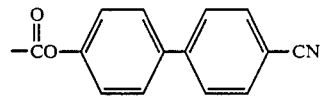

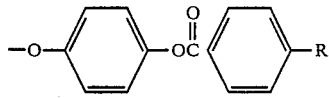

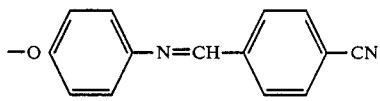

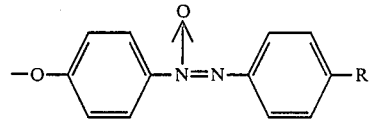

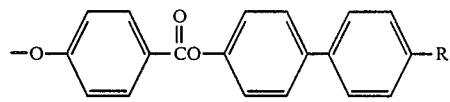

wherein R represents —OCH₃, —OC₂H₅, —OC₃H₇, —OC₄H₉, —OC₅H₁₁, —OC₆H₁₃, —CH₃, —C₂H₅, —C₃H₇, —C₄H₉, —C₅H₁₁, —C₆H₁₃, —C₇H₁₅, —C₈H₁₇, H, Cl, Br, —C₉H₁₉, —C₁₀H₂₁, —C₁₁H₂₃, —C₁₂H₂₅, —C₁₄H₂₉, —C₁₆H₃₃, and Chol represents a compound represented by the formula

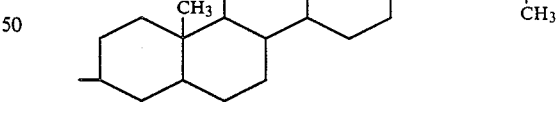

9. A liquid crystal optical element as in claim 6, wherein the main chain in the polymeric liquid crystal is a polyacrylate, polysiloxane or polymethacrylate, the spacer therein is a methylene chain or an oxymethylene chain having from 2 to 18 carbon atoms, and the mesogenic group therein is selected from those represented by formulae

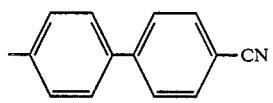

-continued
—O—⟨C₆H₄⟩—⟨C₆H₄⟩—CN
—CO—O—⟨C₆H₄⟩—⟨C₆H₄⟩—CN
wherein R represents —OCH₃, —OC₂H₅, —OC₃H₇, —OC₄H₉, —OC₅H₁₁, —OC₆H₁₃, —CH₃, —C₂H₅, —C₃H₇, —C₄H₉, —C₅H₁₁, —C₆H₁₃, —C₇H₁₅, —C₈H₁₇, H, Cl, Br, —C₉H₁₉, —C₁₀H₂₁, —C₁₁H₂₃, —C₁₂H₂₅, —C₁₄H₂₉, —C₁₆H₃₃, and Chol represents a compound represented by the formula
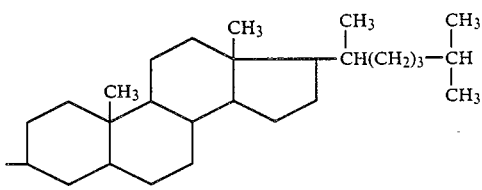
* * * * *